United States Patent
Non et al.

(10) Patent No.: US 10,834,421 B2
(45) Date of Patent: Nov. 10, 2020

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventors: Maxell Rey B. Non, Quezon (PH); Michael Loe G. Fernandez, Quezon (PH); Lee Anthony T. Grajo, Angono (PH); Errol Jayson D. Arzadon, Quezon (PH)

(73) Assignee: CANON KABUSHIKI KAISHA, Tokyo (JP)

( * ) Notice: Subject to any disclaimer, the term of this patent is extended or adjusted under 35 U.S.C. 154(b) by 77 days.

(21) Appl. No.: 16/026,122

(22) Filed: Jul. 3, 2018

(65) Prior Publication Data

US 2019/0014340 A1     Jan. 10, 2019

(30) Foreign Application Priority Data

Jul. 5, 2017    (JP) ................................ 2017-132261

(51) Int. Cl.
    *H04N 19/517*      (2014.01)
    *H04N 19/176*      (2014.01)
    (Continued)

(52) U.S. Cl.
    CPC ......... *H04N 19/517* (2014.11); *H04N 19/119* (2014.11); *H04N 19/176* (2014.11);
    (Continued)

(58) Field of Classification Search
    CPC .. H04N 19/517; H04N 19/119; H04N 19/176; H04N 19/52; H04N 19/96; H04N 19/139; H04N 19/192
    (Continued)

(56) References Cited

U.S. PATENT DOCUMENTS

2012/0140832 A1    6/2012   Sjoberg
2014/0269924 A1    9/2014   Kim
(Continued)

FOREIGN PATENT DOCUMENTS

JP      2015115903 A     6/2015

OTHER PUBLICATIONS

Copending U.S. Appl. No. 16/026,107, filed Jul. 3, 2018.
(Continued)

*Primary Examiner* — William C Vaughn, Jr.
*Assistant Examiner* — Jae N Noh
(74) *Attorney, Agent, or Firm* — Rossi, Kimms & McDowell LLP

(57) ABSTRACT

Encoding information associated with encoding is acquired for each of a plurality of blocks that are obtained by recursively dividing an image region by quadtree spatial splitting. The encoding information of a target block and sub-blocks that belong to the target block if the image region is divided into units of the sub-blocks that are each smaller than the block are stored in a memory in association with each other. Encoding information that is associated with an adjacent sub-block that is adjacent to a first block among the sub-blocks that belong to a second block that is adjacent to the first block in the image region is acquired from the memory. Then, an encoding process is performed using this acquired encoding information and encoding information of the first block.

3 Claims, 6 Drawing Sheets

(51) Int. Cl.
*H04N 19/96* (2014.01)
*H04N 19/119* (2014.01)
*H04N 19/52* (2014.01)
H04N 19/139 (2014.01)
H04N 19/192 (2014.01)

(52) U.S. Cl.
CPC ............ *H04N 19/52* (2014.11); *H04N 19/96* (2014.11); *H04N 19/139* (2014.11); *H04N 19/192* (2014.11)

(58) Field of Classification Search
USPC .................................................... 375/240.24
See application file for complete search history.

(56) References Cited

U.S. PATENT DOCUMENTS

| | | | |
|---|---|---|---|
| 2016/0219302 A1* | 7/2016 | Liu | H04N 19/583 |
| 2017/0339404 A1* | 11/2017 | Panusopone | H04N 19/91 |
| 2019/0191171 A1* | 6/2019 | Ikai | H04N 19/583 |
| 2019/0281294 A1* | 9/2019 | Kim | H04N 19/176 |
| 2019/0342557 A1* | 11/2019 | Robert | H04N 19/176 |

OTHER PUBLICATIONS

Office Action issued in U.S. Appl. No. 16/026,107 dated Dec. 2, 2019.

Office Action issued in U.S. Appl. No. 16/026,107 dated Mar. 23, 2020.

\* cited by examiner

FIG. 5

| COORDINATES OF MCU | MOTION VECTOR |
|---|---|
| MCU(0) : (0, 0) | (Vx0, Vy0) |
| MCU(1) : (8, 0) | (Vx0, Vy0) |
| MCU(2) : (0, 8) | (Vx0, Vy0) |
| MCU(3) : (8, 8) | (Vx0, Vy0) |
| ⋮ | ⋮ |
| MCU(15) : (24, 24) | (Vx0, Vy0) |
| MCU(16) : (32, 0) | (Vx1, Vy1) |
| MCU(17) : (40, 0) | (Vx1, Vy1) |
| MCU(18) : (32, 8) | (Vx1, Vy1) |
| MCU(19) : (40, 8) | (Vx1, Vy1) |
| MCU(20) : (48, 0) | (Vx2, Vy2) |
| MCU(21) : (56, 0) | (Vx2, Vy2) |
| MCU(22) : (48, 8) | (Vx2, Vy2) |
| MCU(23) : (56, 8) | (Vx2, Vy2) |
| MCU(24) : (32, 16) | (Vx3, Vy3) |
| ⋮ | ⋮ |
| MCU(32) : (0, 32) | (Vx5, Vy5) |
| MCU(33) : (8, 32) | (Vx6, Vy6) |
| MCU(34) : (0, 40) | (Vx7, Vy7) |
| MCU(35) : (8, 40) | (Vx8, Vy8) |
| ⋮ | ⋮ |
| MCU(48) : (32, 32) | (Vx12, Vy12) |
| ⋮ | ⋮ |
| MCU(62) : (48, 56) | (Vx12, Vy12) |
| MCU(63) : (56, 56) | (Vx12, Vy12) |

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to encoding technology.

Description of the Related Art

The H.265/HEVC (High Efficiency Video Coding) system (referred to as "HEVC" hereinafter) is known as an encoding system for compressing and recording movies. In HEVC, images of frames that constitute a movie are each divided into blocks called CTUs (Coding Tree Units) by quadtree spatial splitting. Also, the CTUs can be further subjected to quadtree spatial splitting recursively. In HEVC, a CTU may have a block size of 64×64, 32×32, or 16×16. Also, a CU (Coding Unit) obtained by recursively subjecting a CTU to quadtree spatial splitting may have a block size of 64×64, 32×32, 16×16, or 8×8. In HEVC, an encoding process is performed in units of CUs. Japanese Patent Laid-Open No. 2015-115903 discloses a technique for also improving image quality while increasing the encoding efficiency at the time of image variation in a compression method with a variable block size.

In the encoding of a motion vector in HEVC, one of the motion vectors of blocks (CUs) that are adjacent to the target block (CU) corresponding to that motion vector is selected, and a difference between the selected motion vector and the motion vector of the target block is encoded. In order to perform such encoding, it is necessary to acquire the motion vectors of blocks that are adjacent to the target block.

FIG. 1 shows a CTU having 64 pixels vertically and 64 pixels horizontally, with the coordinates (X-coordinate, Y-coordinate) of the upper left corner of the CTU being (0, 0), and the coordinates (X-coordinate, Y-coordinate) of the lower right corner of the CTU being (63, 63). This CTU is divided into 13 CUs by recursive quadtree spatial splitting. Numbers 0 to 12 added to the CUs indicate the order of reading out (the order of encoding) of the corresponding CUs, and are in so-called Morton order. Hereinafter, the CU provided with a number N (N=0 to 12) will be referred to as CU(N).

In order to encode the motion vector of the CU(N), it is necessary to reference the motion vectors of the CUs that are adjacent to the CU(N) and have a prescribed positional relationship with the CU(N), and to specify the motion vector that will produce the smallest amount of encoding, from among those motion vectors. Herein, the case where the motion vector of a CU(0) is referenced in order to encode the motion vector of a CU(9) will be considered. The motion vector of the CU(N) is managed in a memory in association with the coordinates of the CU(N) (the coordinates of the upper left corner, for example), and thus in order to read out the motion vector of the CU(N) from the memory, it is necessary to specify the coordinates of this CU(N). The coordinates of the CU(9) (coordinates of the upper left corner) are (16, 32), and the size thereof is 16 pixels vertically and 16 pixels horizontally. Also, the coordinates of the CU(0) (coordinates of the upper left corner) are (0, 0), and the size thereof is 32 pixels vertically and 32 pixels horizontally. Thus, in order to read out the motion vector of the CU(0) from the memory, it is necessary to obtain a position obtained by offsetting the coordinates of the CU(9) that is currently being focused on, by "−16" in the X-coordinate direction and "−32" in the Y-coordinate direction.

Also, the case where the motion vector of the CU(3) is referenced in order to encode the motion vector of a CU(12) will be considered. The coordinates of the CU(12) (coordinates of the upper left corner) are (32, 32), and the size thereof is 32 pixels vertically and 32 pixels horizontally. Also, the coordinates of the CU(3) (coordinates of the upper left corner) are (32, 16), and the size thereof is 16 pixels vertically and 16 pixels horizontally. Thus, in order to read out the motion vector of the CU(3) from the memory, it is necessary to obtain a position obtained by offsetting the coordinates of the CU(12) that is currently being focused on by "0" in the X-coordinate direction and "−16" in the Y-coordinate direction.

In this manner, if the CTU is subjected to quadtree spatial splitting, all of the CUs do not necessarily have the same size, and thus in this case, the above-described offset amount is not a constant value. Thus, in order to acquire the motion vector of adjacent CUs, it is necessary to calculate the positions of these CUs every time, and processing becomes complicated.

SUMMARY OF THE INVENTION

The present invention was made in light of such problems, and provides a technique for more quickly acquiring encoding information of adjacent blocks (CUs).

According to the first aspect of the present invention, there is provided an image processing apparatus comprising: an acquisition unit configured to acquire encoding information associated with encoding, for each of a plurality of blocks that are obtained by recursively dividing an image region by quadtree spatial splitting; a storage control unit configured to store the encoding information of a target block and sub-blocks that belong to the target block if the image region is divided into units of the sub-blocks that are each smaller than the block in a memory in association with each other; and an encoding unit configured to acquire, from the memory, encoding information that is associated with an adjacent sub-block that is adjacent to a first block among the sub-blocks that belong to a second block that is adjacent to the first block in the image region, and perform an encoding process using the acquired encoding information and encoding information of the first block.

According to the second aspect of the present invention, there is provided an image processing method that is performed by an image processing apparatus, the method comprising: acquiring encoding information associated with encoding, for each of a plurality of blocks that are obtained by recursively dividing an image region by quadtree spatial splitting; storing the encoding information of a target block and sub-blocks that belong to the target block if the image region is divided into units of the sub-blocks that are each smaller than the block in a memory in association with each other; and acquiring, from the memory, encoding information that is associated with an adjacent sub-block that is adjacent to a first block among the sub-blocks that belong to a second block that is adjacent to the first block in the image region, and performing an encoding process using the acquired encoding information and encoding information of the first block.

According to the third aspect of the present invention, there is provided a non-transitory computer-readable storage medium storing a computer program for causing a computer to function as: an acquisition unit configured to acquire encoding information associated with encoding, for each of a plurality of blocks that are obtained by recursively dividing an image region by quadtree spatial splitting; a storage control unit configured to store the encoding information of a target block and sub-blocks that belong to the target block if the image region is divided into units of the sub-blocks that are each smaller than the block, in a memory in association with each other; and an encoding unit configured to acquire, from the memory, encoding information that is associated with an adjacent sub-block that is adjacent to a first block among the sub-blocks that belong to a second block that is adjacent to the first block in the image region, and perform an encoding process using the acquired encoding information and encoding information of the first block.

Further features of the present invention will become apparent from the following description of exemplary embodiments with reference to the attached drawings.

BRIEF DESCRIPTION OF THE DRAWINGS

FIG. 5 is a diagram showing a configuration example of registration information.

DESCRIPTION OF THE EMBODIMENTS

Hereinafter, embodiments of the present invention will be described in detail with reference to accompanying drawings. Note that the embodiments described below illustrate examples of specific instances in which the present invention is carried out, and are specific working examples of the configuration recited in the claims.

First Embodiment

Figure 2:
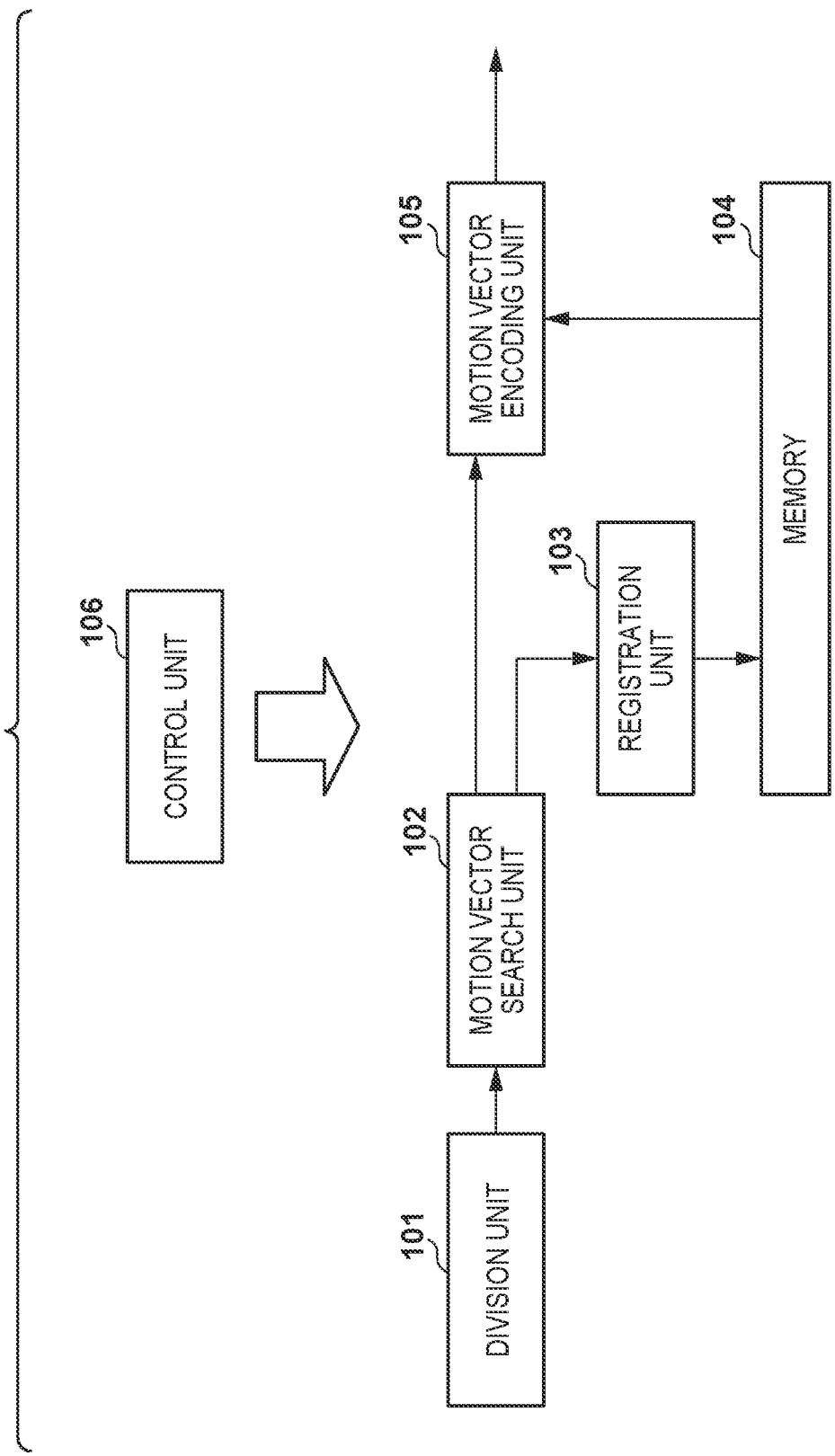
FIG. 2 is a block diagram showing a functional configuration example of an image processing apparatus.

An image processing apparatus configured to encode images of frames that constitute a movie will be described in the present embodiment. First, a functional configuration example of the image processing apparatus according to the present embodiment will be described using the block diagram of FIG. 2. Note that FIG. 2 shows the configuration relating to the encoding of a motion vector in the encoding of a movie, and does not show the overall configuration relating to the encoding of a movie. That is, the configuration shown in FIG. 2 is obtained by extracting the configuration for encoding a motion vector from the configuration of an image processing apparatus configured to perform inter/intra prediction encoding on a movie. Note that in the encoding of a movie, processes other than the encoding of a motion vector are similar to conventional processes, and thus detailed description relating thereto will be omitted.

A division unit 101 acquires images (input images) of frames that constitute a movie and recursively divides these input images by quadtree spatial splitting. The division unit 101 first divides the input images into a plurality of CTUs (Coding Tree Units) by quadtree spatial splitting, and subjects the CTU to recursive quadtree spatial splitting so as to obtain CUs (Coding Units).

A motion vector search unit 102 searches for a motion vector for each CU obtained through division by the division unit 101. Processing for searching for a motion vector for each CU is known, and thus description relating thereto will be omitted.

A registration unit 103 registers, in a memory 104, the coordinates of each MCU obtained in the case where the CTU is divided into units of CUs having the minimum division size (referred to as "MCUs" hereinafter) in quadtree spatial splitting in association with the motion vector of the CU to which the MCU belongs among the CUs obtained through division by the division unit 101.

A motion vector encoding unit 105 encodes the motion vectors of CUs. During the encoding of a motion vector of a CU, the motion vector that is estimated will produce the smallest amount of encoding is specified from among the motion vectors of adjacent CUs that are adjacent to the CU (that is being focused on) and have a prescribed positional relationship with this CU, and a difference between this specified motion vector and the motion vector of this CU is encoded. The control unit 106 performs operation control of the division unit 101, the motion vector search unit 102, the registration unit 103, and the motion vector encoding unit 105.

Figure 1:
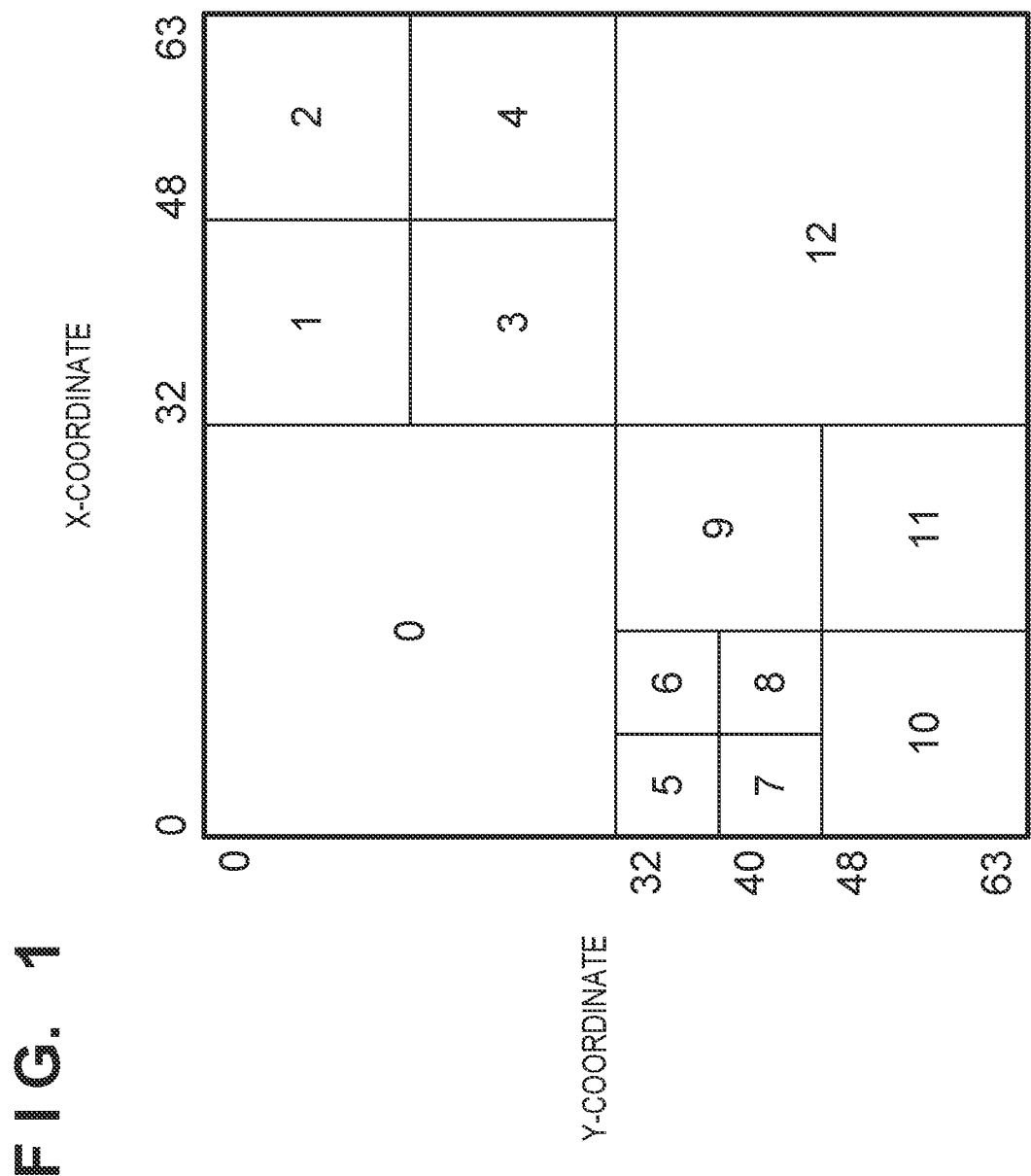
FIG. 1 is a diagram illustrating a configuration example of a CTU.
Figure 3:
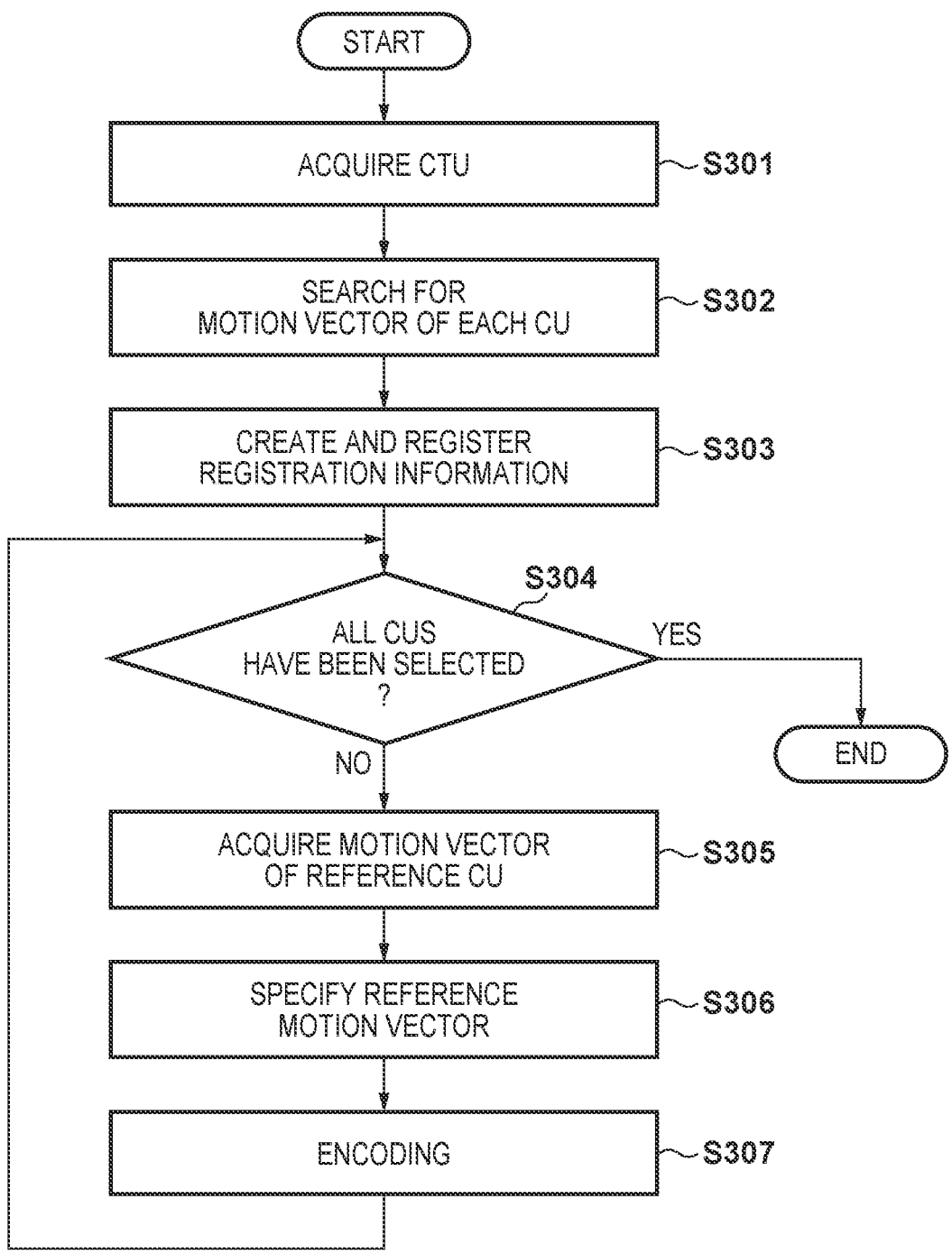
FIG. 3 is a flowchart of processing that the image processing apparatus performs in order to encode a CTU.

Next, processing performed by the above-described image processing apparatus in order to encode one CTU will be described with reference to the flowchart shown in FIG. 3. Accordingly, the image processing apparatus performs processes according to the flowchart shown in FIG. 3 on the respective CTUs that constitute one input image, and thereby can perform encoding on the motion vectors of the CUs in this input image. Hereinafter, processing in which the CTU shown in FIG. 1 is input to the motion vector encoding unit 105 from the division unit 101 will be described as one example. Also, hereinafter, the coordinates of the MCU and the coordinates of the CUs respectively refer to the coordinates of the upper left corner of the MCU and the coordinates of the upper left corner of the CU.

In step S301, the motion vector encoding unit 105 acquires the CTU shown in FIG. 1 that is generated by the division unit 101 dividing the input image by quadtree spatial splitting. The CTU shown in FIG. 1 is as described above.

In step S302, the motion vector search unit 102 searches for the motion vectors of the CUs (CU(0) to CU(12)) shown in FIG. 1.

In step S303, the registration unit 103 creates registration information for managing the coordinates of the respective MCUs in the case where the CTU shown in FIG. 1 is divided into units of CUs (MCUs) that each have 8 pixels×8 pixels in association with the motion vectors retrieved in step S302 with regard to the CUs to which these MCUs belong, and registers this created registration information in the memory 104.

Figure 4:
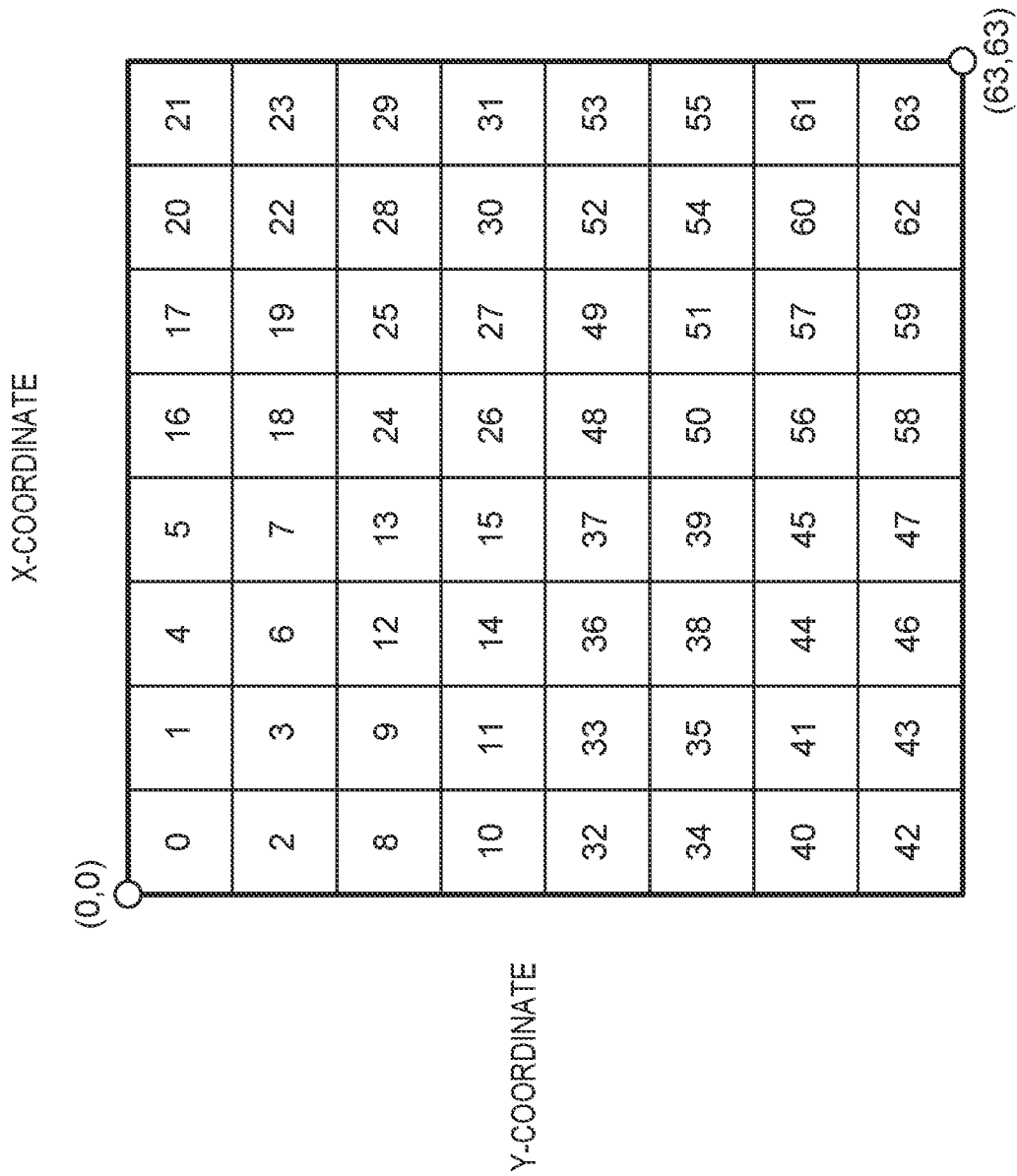
FIG. 4 is a diagram showing a division example in which the CTU is divided into units of MCUs having 8 pixels×8 pixels.

Herein, FIG. 4 shows a division example in which the CTU shown in FIG. 1 is divided into units of MCUs having 8 pixels×8 pixels. Each cell represents an MCU, and the numbers on the cells indicate the order of encoding (the order of encoding follows Morton order). Hereinafter, the MCU provided with a number N (N=0 to 63) will be referred to as MCU(M).

As described above, the CTU has a size of 64 pixels×64 pixels, and is divided into units of MCUs having a size of 8 pixels×8 pixels, and thus as shown in FIG. 4, this CTU is divided into 8 MCUs vertically and 8 MCUs horizontally. In such a case, all of the MCUs will be included in one of the CUs. For example, the MCU(0) to the MCU(15) are included in the CU(0). Also, for example, the MCU(24) to the MCU(27) are included in the CU(3). In the registration information generated by the registration unit 103, the motion vector of the CU(N) is managed in association with the coordinates of the MCUs included in the CU(N). For example, the motion vector of the CU(0) is managed using the registration information in association with the coordinates of the MCU(0) to the MCU(15). Also, for example, the motion vector of the CU(3) is managed using the registration information in association with the coordinates of the MCU(24) to the MCU(27).

FIG. 5 shows a configuration example of the registration information. The MCU(0) to the MCU(15) are all MCUs that belong to the CU(0). Thus, in the registration information, components (Vx0, Vy0) of the motion vector of the CU(0) are associated with the coordinates (0, 0), (8, 0), (0, 8), (8, 8) . . . (24, 24) of the MCU(0) to the MCU(15). Also, the MCU(20) to the MCU(23) are all MCUs that belong to the CU(2). Thus, in the registration information, components (Vx2, Vy2) of the motion vector of the CU(2) are associated with the coordinates (48, 0), (56, 0), (48, 8), and (56, 8) of the MCU(20) to the MCU(23).

Returning to FIG. 3, next, in step S304, the motion vector encoding unit 105 determines whether or not all of the CUs in the CTU shown in FIG. 1 have been selected (whether or not the motion vectors of all of the CUs have been encoded). As a result of this determination, if all of the CUs in the CTU shown in FIG. 1 have been selected, the processing performed on the CTU shown in FIG. 1 according to the flowchart shown in FIG. 3 ends. On the other hand, if any unselected CUs remain in the CTU shown in FIG. 1, the processing advances to step S305.

In step S305, the motion vector encoding unit 105 selects one of the unselected CUs in the CTU shown in FIG. 1 as a selected CU. Selection of a CU is performed in accordance with the encoding order of the CUs. The motion vector encoding unit 105 then acquires, from the memory 104, the motion vector of a reference CU for referencing in order to encode the motion vector of the selected CU. For example, if the CU(11) is selected as the selected CU, the reference CUs are the CU(8) to the CU(10) (CUs whose motion vectors have been encoded).

Here, if the motion vector of the reference CU is read out from the memory 104, motion vectors which are managed using the registration information in association with MCUs that are adjacent to the MCU in the upper left corner of the selected CU, among the MCUs included in the reference CU, are read out. For example, when the coordinates of the selected CU are (x, y), the motion vectors that are managed using the registration information in association with the coordinates (x-8, y-8), (x, y-8), and (x-8, y) are acquired.

Conventionally, in order to acquire the motion vector of the reference CU, it was necessary to obtain the amount of offset from the coordinates of the selected CU to the coordinates of the reference CU, and the motion vector associated with the coordinates that are offset from the coordinates of the selected CU by this offset amount was acquired. In contrast, in the present embodiment, the motion vector of the CU is managed in association with the MCUs included in this CU, and thus the motion vector of the reference CU can be acquired from a MCU that is adjacent to the selected CU. Accordingly, the motion vector of the reference CU can be acquired without obtaining the amount of offset from the coordinates of the selected CU to the coordinates of the reference CU.

For example, in FIG. 1, if the CU(12) is the selected CU and the reference CU is the CU(3), conventionally, in order to acquire the motion vector of the CU(3), it was necessary to obtain the amount of offset of the coordinates of the CU(3) with respect to the coordinates of the CU(12). In this respect, in the case of the present embodiment, the motion vector of the CU(3) can be acquired from the MCU(26) of the CU(3) that is adjacent to the upper left corner of the CU(12), and thus the motion vector of the CU(3) can be acquired without obtaining the above-described offset amount.

In step S306, the motion vector encoding unit 105 specifies, from among the motion vectors acquired in step S305, the motion vector having the smallest difference from the motion vector of the selected CU as a reference motion vector.

In step S307, the motion vector encoding unit 105 encodes the difference between the motion vector of the selected CU and the reference motion vector. The result of the encoding performed by the motion vector encoding unit 105 is added to data obtained by encoding the input image and the resultant data is output. Two prediction encoding modes, namely, an inter prediction encoding mode for performing inter prediction (inter-screen prediction, motion-compensated prediction) and an intra prediction encoding mode for performing intra-prediction (intra-screen prediction), are adopted in the encoding process performed on the input image. In the encoding process performed on the input image, encoding (inter prediction encoding/intra prediction encoding) corresponding to the prediction encoding mode that is set by the control unit 106 out of these two prediction encoding modes is performed. In both prediction encoding modes, "a series of processes such as intra prediction/inter prediction, quantization, and entropy encoding" are performed in units of CUs.

Note that data obtained by encoding the input image is not necessarily output to a specific destination, may be output to a memory in the image processing apparatus, or may be output to an external device connected to the image processing apparatus via a network such as a LAN or the Internet. The processing then returns to step S304.

Note that specific numerical values used in the present embodiment are used for giving specific description, and the above-described processes are not limited to the above-described numerical values, and any numerical values may be used. For example, although the size of the MCU was 8 pixels×8 pixels in the above description, this is an example of a size that is smaller than that of the CU (8 pixels×8 pixels), and the size thereof is not limited to this, and the MCU may have a size of 4 pixels×4 pixels, for example. Also, the size of the CTU is not limited to 64 pixels×64 pixels, and may be 32 pixels×32 pixels.

Also, although registration information was created in order to associate an MCU and the motion vectors of the CUs that include this MCU in the above description, a method for making such association is not limited to a specific method.

Also, although the memory 104 is a memory provided in the image processing apparatus in FIG. 2, the memory 104 may be a memory provided outside the image processing apparatus. Also, although a configuration for encoding a motion vector was described in the present embodiment, the motion vector was described as an example of the encoding information associated with the encoding of the CU, and the encoding information is not limited to the motion vector. For example, the encoding information may be information indicating whether or not either intra prediction or inter prediction is selected, or information indicating an intra prediction mode. In such a case, the image processing apparatus performs an encoding process through the following operation.

First, the image processing apparatus acquires encoding information associated with encoding, for each of a plurality of blocks that are obtained by recursively dividing an image region by quadtree spatial splitting. The encoding information of a target block and sub-blocks that belong to the target block when the image region is divided into units of the sub-blocks that are each smaller than the target block are stored in a memory in association with each other (storage control). Encoding information that is associated with adjacent sub-blocks that are adjacent to a first block among sub-blocks belonging to a second block that is adjacent to the first block in the image region is acquired from the memory. Then, the image processing apparatus performs an encoding process using this acquired encoding information and the encoding information of the first block.

Second Embodiment

The functional units shown in FIG. 2 may be implemented by hardware, or the functional units other than the memory 104 may be implemented by software (computer program). In the former case, such hardware may be incorporated in a computer apparatus such as a digital camera, a smartphone, a tablet terminal, and a network camera. On the other hand, in the latter case, a computer apparatus having a processor that is capable of executing computer programs corresponding to the functional units (other than the memory 104) shown in FIG. 2 can be applied to the above-described image processing apparatus. A hardware configuration example of the computer apparatus having a processor that is capable of executing computer programs corresponding to the functional units (other than the memory 104) shown in FIG. 2 will be described using the block diagram of FIG. 6.

A CPU 601 executes processing using computer programs and data stored in a RAM 602 or a ROM 603. Accordingly, the CPU 601 performs overall operational control of the computer apparatus, and executes or controls the above-described processes as processes that the image processing apparatus performs.

The RAM 602 has an area for storing computer programs and data that are loaded from the ROM 603 or an external storage device 606, and data that is received from an external device via an I/F (interface) 607. Furthermore, the RAM 602 has a work area that the CPU 601 uses when executing various processes. In this manner, the RAM 602 can provide various areas as appropriate. The above-described memory 104 may be implemented by the RAM 602.

Computer programs that do not require rewriting (a BIOS computer program and a startup program, for example) and data (data on the settings of the computer apparatus, for example) are stored in the ROM 603.

An operation unit 604 is configured by user interfaces such as a keyboard and a mouse, and various instructions can be input to the CPU 601 by a user operating the operation unit 604.

An output unit 605 is configured by devices such as a display device configured by a CRT, a liquid crystal screen, and the like, and a projection device configured to project an image or characters on a wall surface or the like, and the output unit 605 displays/projects the results of processing performed by the CPU 601 using images, characters, or the like. The display device may be a touch panel screen.

An external storage device 606 is a large-capacity information storage device typified by a hard disk drive. Computer programs and data for causing the CPU 601 to execute an OS (operation system) and the processes described as processes that the image processing apparatus performs are stored in the external storage device 606. The computer programs stored in the external storage device 606 include a computer program for causing the CPU 601 to realize the functions (other than the memory 104) of the functional units shown in FIG. 2. Also, data stored in the external storage device 606 includes the above-described registration information, an encoding parameter that the motion vector encoding unit 105 uses in the encoding, and the like. The computer programs and data that are stored in the external storage device 606 are loaded to the RAM 602 in accordance with the control performed by the CPU 601 and will be processed by the CPU 601. The above-described memory 104 may be implemented by the external storage device 606.

The I/F 607 functions as the interface for performing data communication with an external device, and an image capturing apparatus configured to capture a movie can be connected to the I/F 607 and images of frames that constitute the above-described movie can be acquired via this I/F 607. Also, the I/F 607 may include a network interface for connecting a network such as a LAN or the Internet, and various types of information in the above description may be acquired from an external device via the I/F 607.

Figure 6:
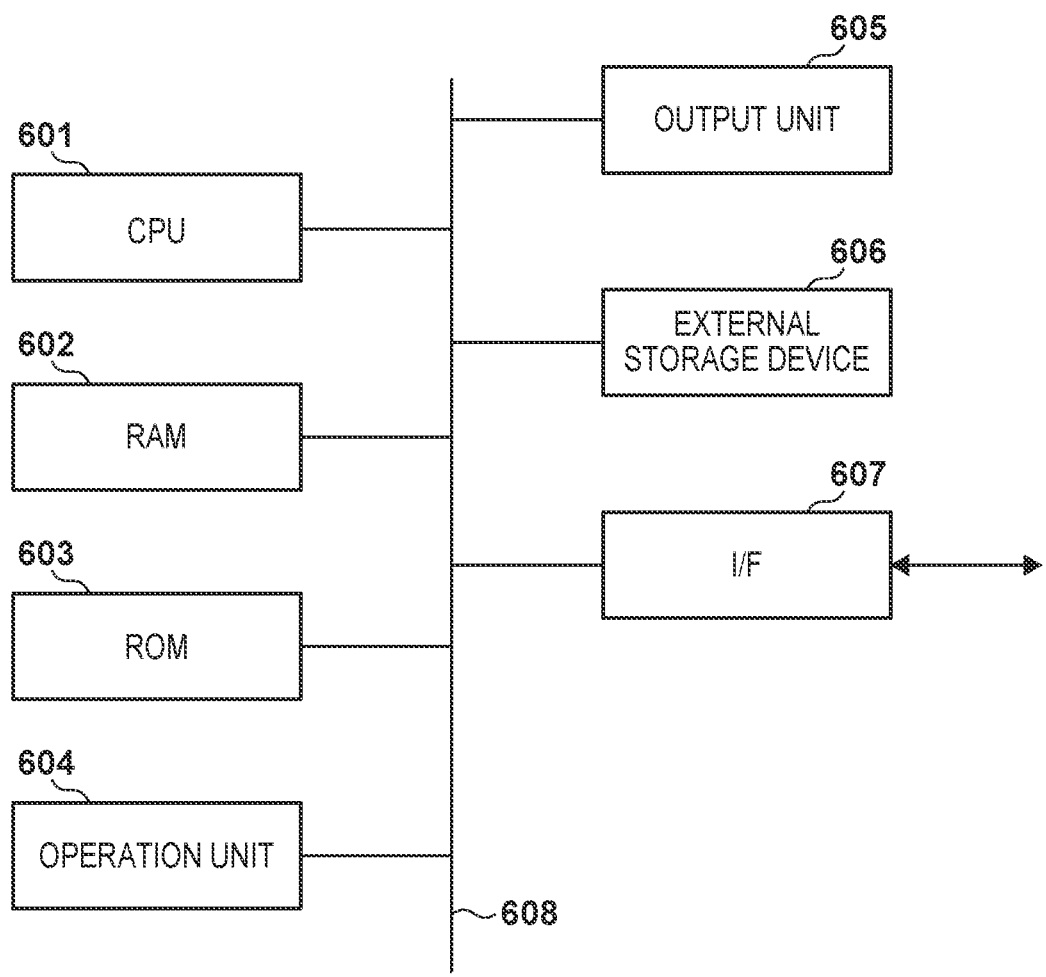
FIG. 6 is a block diagram showing a hardware configuration example of a computer apparatus.

The above-described CPU 601, RAM 602, ROM 603, operation unit 604, output unit 605, external storage device 606, and I/F 607 are all connected to a bus 608. Note that the hardware configuration shown in FIG. 6 is merely one example of the hardware configuration of a computer apparatus that can be applied to the above-described image processing apparatus.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-132261, filed Jul. 5, 2017, which is hereby incorporated by reference herein in its entirety.

What is claimed is:

1. An image processing apparatus comprising:
a memory which stores coordinates of respective minimum coding units each having a minimum size for a coding tree unit;
a division processor configured to divide the coding tree unit into a plurality of blocks by recursively quadtree spatial splitting, wherein the plurality of blocks includes a first block and a second block, wherein the second block is adjacent to the first block and is larger than the minimum coding unit;
an acquisition processor configured to acquire a first motion vector for the first block and a second motion vector for the second block;
a registration processor configured to register the first motion vector in the memory so as to associate the first motion vector with first respective coordinates of minimum coding units corresponding to the first block, and register the second motion vector in the memory so as to associate the second motion vector with second respective coordinates of minimum coding units corresponding to the second block; and
an encoding processor configured to encode information on a difference between the first motion vector for the first block and the second motion vector which is associated with a coordinate of an adjacent minimum coding unit adjacent to one of the minimum coding units corresponding to the first block, the coordinate of the adjacent minimum coding unit being one of the second respective coordinates of minimum coding units corresponding to the second block.

2. An image processing method that is performed by an image processing apparatus including a memory which stores coordinates of respective minimum coding units each having a minimum size for a coding tree unit, the method comprising:
dividing the coding tree unit into a plurality of blocks by recursively quadtree spatial splitting, wherein the plurality of blocks includes a first block and a second block, wherein the second block is adjacent to the first block and is larger than the minimum coding unit;
acquiring a first motion vector for the first block and a second motion vector for the second block;
registering the first motion vector in the memory so as to associate the first motion vector with first respective coordinates of minimum coding units corresponding to the first block, and register the second motion vector in the memory so as to associate the second motion vector with second respective coordinates of minimum coding units corresponding to the second block; and
encoding information on a difference between the first motion vector for the first block and the second motion vector which is associated with a coordinate of an adjacent minimum coding unit adjacent to one of the minimum coding units corresponding to the first block, the coordinate of the adjacent minimum coding unit being one of the second respective coordinates of minimum coding units corresponding to the second block.

3. A non-transitory computer-readable storage medium storing a computer program that, when executed by a computer, causes the computer to perform a method of controlling an image processing apparatus including a memory which stores coordinates of respective minimum coding units each having a minimum size for a coding tree unit, the method comprising:
dividing the coding tree unit into a plurality of blocks by recursively quadtree spatial splitting, wherein the plurality of blocks includes a first block and a second block, wherein the second block is adjacent to the first block and is larger than the minimum coding unit;
acquiring a first motion vector for the first block and a second motion vector for the second block;
registering the first motion vector in the memory so as to associate the first motion vector with first respective coordinates of minimum coding units corresponding to the first block, and register the second motion vector in the memory so as to associate the second motion vector with second respective coordinates of minimum coding units corresponding to the second block; and
encoding information on a difference between the first motion vector for the first block and the second motion vector which is associated with a coordinate of an adjacent minimum coding unit adjacent to one of the minimum coding units corresponding to the first block, the coordinate of the adjacent minimum coding unit being one of the second respective coordinates of minimum coding units corresponding to the second block.

* * * * *